C. STEENSTRUP.
SHAFT COUPLING AND METHOD OF MAKING SAME.
APPLICATION FILED NOV. 1, 1919.

1,393,582.

Patented Oct. 11, 1921.

Inventor:
Christian Steenstrup,
by Albert G. Davis
His Attorney.

UNITED STATES PATENT OFFICE.

CHRISTIAN STEENSTRUP, OF SCHENECTADY, NEW YORK, ASSIGNOR TO GENERAL ELECTRIC COMPANY, A CORPORATION OF NEW YORK.

SHAFT-COUPLING AND METHOD OF MAKING SAME.

1,393,582.

Specification of Letters Patent.

Patented Oct. 11, 1921.

Application filed November 1, 1919. Serial No. 335,036.

*To all whom it may concern:*

Be it known that I, CHRISTIAN STEENSTRUP, a citizen of the United States, residing at Schenectady, in the county of Schenectady, State of New York, have invented certain new and useful Improvements in Shaft-Couplings and Methods of Making Same, of which the following is a specification.

The present invention relates to shaft couplings of the jaw type and has for its object to provide an improved method of manufacturing the same whereby a very accurate coupling may be produced at a low cost.

For a consideration of what I believe to be novel and my invention, attention is directed to the accompanying description and the claims appended thereto.

Figure 1:
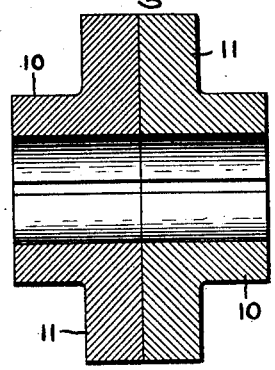
Figure 2:
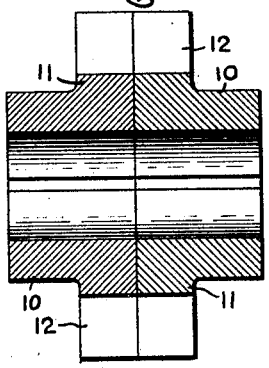
Figure 3:
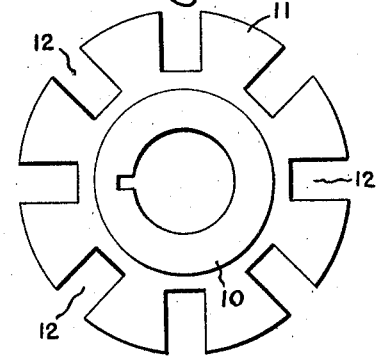
Figure 4:
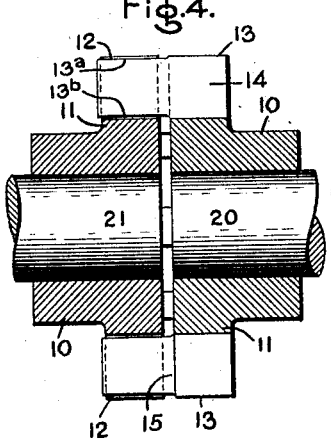
Figure 5:
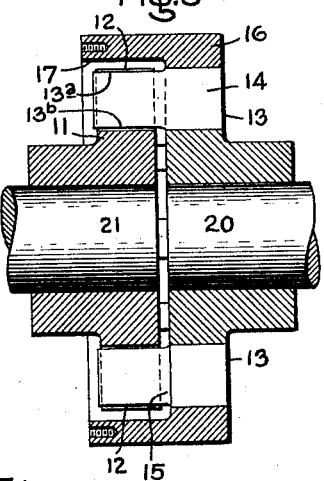
Figure 6:
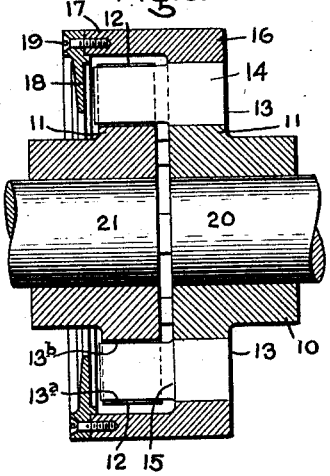
Figure 7:
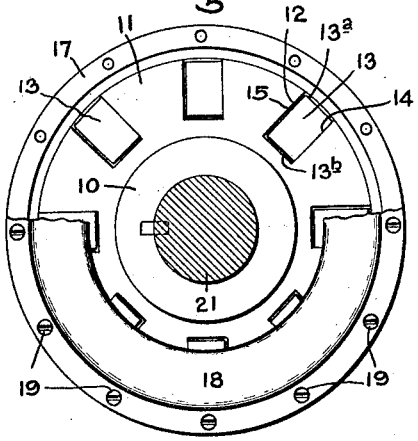

In the drawing, Figures 1 and 2 are sectional views illustrating two successive steps in the manufacture of a coupling; Fig. 3 is a face view of one of the flanges after it has been slotted, as shown in Fig. 2; Figs. 4, 5 and 6 are sectional views illustrating further successive steps in the manufacture of a coupling; Fig. 7 is a face view partly broken away of a completed coupling, and Fig. 8 is a perspective view of a driving key.

In carrying out my invention, I take suitable pieces of stock and form two coupling members each comprising a hub 10 and a flange 11, and after they have been finished and bored, they are forced onto a mandrel with their flanges 11 in contact with each other as shown in Fig. 1. While held firmly in this relation the flanges are slotted as indicated at 12 in Fig. 2, the work being preferably done on a gear cutter. The slots are suitably spaced as indicated in Fig. 3 and it will be clear that by following this method of forming them, they are accurately located in axial alinement with each other with their faces exactly flush and lying in the same plane.

Figure 8:
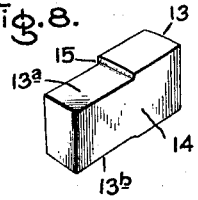

After the flanges 11 have been slotted, rectangular blocks 13 as shown in Fig. 8 are placed in slots 12. Each block 13 has a flat, smooth driving face or surface 14 but on its back it is cut down at one end as indicated at 15 so that when placed in a slot 12 it fits the slot in one flange tightly but not the slot in the other flange. In other words, each block 13 will have one end firmly fastened in a slot 12 of one flange and will be carried by such flange; and the other end will project into a slot of the other flange with the driving face 14 engaging the one side of such slot. Blocks 13 are also preferably cut down at the one end as indicated at $13^a$ and $13^b$ so they will fit the slots of the one flange loosely at the top and bottom as shown in Fig. 7. That is, blocks 13 are so made that they fit the slots of one flange tightly but engage the walls of the slots of the other flange only on their driving sides. After the blocks 13 are all fastened into the slots of the one flange (the right hand flange of Figs. 4, 5 and 6) a ring 16 is shrunk on its periphery to firmly hold the blocks in position. Ring 16 is preferably provided with an annular skirt 17 which projects over the periphery of the other flange 11 and at the edge of skirt 17 is a radially inwardly projecting flange 18 fastened to skirt 17 by suitable screws 19. Skirt 17 and flange 18 form an oil pocket to provide lubricant to blocks or keys 13, it being clear that when the coupling is turning oil will be held in the pocket by centrifugal force. In Figs. 4, 5, 6 and 7 hubs 10 are shown as being mounted on adjacent shaft ends 20 and 21 which may be the ends of driving and driven shafts respectively, and the arrangement is such that a limited amount of axial adjustment may take place which is one of the features of this type of coupling.

By utilizing the foregoing method of manufacture I provide a coupling which is very accurate so that the face 14 of each block or driving key 13 will engage accurately and evenly the adjacent surface of its slot, and each block will carry its share of the load. At the same time the coupling is cheap and simple to make.

As is clear, in the finished structure, I have a jaw type coupling wherein one flange carries projections which engage openings in the other flange, and one embodying all the usual features of a jaw type coupling.

What I claim as new and desire to secure by Letters Patent of the United States, is:—

1. The method of making a coupling which comprises fastening two flanges in engagement with each other, cutting slots in their edges and fastening driving keys in the slots of one flange which keys project into the slots of the other flange.

2. The method of making a coupling which comprises fastening two flanges in engagement with each other, cutting slots in their edges and fastening driving keys in the slots of one flange, said keys each having a flat driving face and being of such size as to fit tightly the slots of one flange and loosely the slots of the other flange.

3. The method of making a coupling which comprises fastening two flanges in engagement with each other, cutting slots in their edges, fastening and driving keys in the slots of one flange, said keys each having a flat driving face and being of such size as to fit tightly the slots of one flange and loosely the slots of the other flange, and shrinking a ring on said one flange to hold the keys in position.

4. The method of making a coupling which comprises taking two flanged hubs, fastening them together with the flanges in engagement, milling slots in the edges of said flanges, and placing driving keys in said slots.

5. In a coupling, a pair of adjacent flanges having slots in their edges, driving keys each having one end fixed in a slot of one flange and the other end projecting into a slot of the other flange, and a holding ring for the driving keys shrunk around the flange in which the keys are fixed.

In witness whereof I have hereunto set my hand this 30th day of October, 1919.

CHRISTIAN STEENSTRUP.

It is hereby certified that in Letters Patent No. 1,393,582, granted October 11, 1921, upon the application of Christian Steenstrup, of Schenectady, New York, for an improvement in "Shaft-Couplings and Methods of Making Same," an error appears in the printed specification requiring correction as follows: Page 2, line 10, claim 3, strike out the word "and"; and that the said Letters Patent should be read with this correction therein that the same may conform to the record of the case in the Patent Office.

Signed and sealed this 15th day of November, A. D., 1921.

[SEAL.] KARL FENNING,

*Acting Commissioner of Patents.*